(12) United States Patent
Prigge et al.

(10) Patent No.: US 8,825,195 B2
(45) Date of Patent: Sep. 2, 2014

(54) METHOD FOR MOVER TRANSITION IN AN AUTOMATED MEDIA LIBRARY

(75) Inventors: Carsten H. Prigge, Elizabeth, CO (US); Bruno H. Hald, Castle Rock, CO (US); Mark Roberts, Littleton, CO (US); Alexander Hois, Castle Rock, CO (US); Devin B. Armstrong, Parker, CO (US)

(73) Assignee: Quantum Corporation, San Jose, CA (US)

( * ) Notice: Subject to any disclaimer, the term of this patent is extended or adjusted under 35 U.S.C. 154(b) by 84 days.

(21) Appl. No.: 13/485,754

(22) Filed: May 31, 2012

(65) Prior Publication Data

US 2013/0325167 A1 Dec. 5, 2013

(51) Int. Cl.
*G06F 19/00* (2011.01)
*G06F 3/00* (2006.01)

(52) U.S. Cl.
USPC ........... 700/214; 700/213; 700/215; 700/226; 700/228

(58) Field of Classification Search
None
See application file for complete search history.

(56) References Cited

U.S. PATENT DOCUMENTS

| 5,894,461 | A  | * | 4/1999 | Fosler et al. | 369/30.31 |
| 5,914,919 | A  | * | 6/1999 | Fosler et al. | 369/30.31 |
| 6,996,635 | B2 | * | 2/2006 | Goodman et al. | 710/5 |
| 2009/0028322 | A1 | * | 1/2009 | Goodman et al. | 380/2 |

* cited by examiner

*Primary Examiner* — Yolanda Cumbess
(74) *Attorney, Agent, or Firm* — Roeder & Broder LLP; James P. Broder

(57) ABSTRACT

A method for mover transition in an open systems based media library (14) for use with a host (10) that relays command requests comprises the steps of retaining a storage medium (20); selectively moving the storage medium (20) within the media library (14) with a first media mover (26); and when the first media mover (26) has a status of unavailable due to mover transition, indicating to the host (10) with a control system (40) that the first media mover (26) is not ready to perform a motion operation, and is in the process of becoming ready. Additionally, the host (10) continues to relay command requests to the media library (14) when the first media mover (26) has the status of unavailable, and the control system (40) performs any subsequent command requests relayed by the host (10) when the first media mover (26) subsequently has the status of available.

18 Claims, 3 Drawing Sheets

METHOD FOR MOVER TRANSITION IN AN AUTOMATED MEDIA LIBRARY

BACKGROUND

Automated media libraries typically use one or more movers, e.g., robots, to access media devices, e.g., tape cartridges, that are stored within the automated media library. For example, a single mover, robot or media changer device can be utilized to access media devices that are stored within the automated media library. Alternatively, multiple or redundant movers, robots or media changer devices can be utilized in an automated media library, which operate in either an active/passive mode or an active/active mode.

During operation of the automated media library, e.g., an automated tape library, one or more of the movers can move between a status of being available and a status of being unavailable, such as due to failure, scheduled maintenance, etc. As utilized herein, the term "available" with regard to the movers signifies that the movers are ready and able to be used at that time to perform operations and/or command requests, e.g., motion requests for accessing certain specific storage media within the automated media library, from host applications, users, etc. Conversely, as utilized herein, the term "unavailable" with regard to the movers signifies that the movers cannot be used at that time to perform operations and/or command requests from host applications, users, etc. due to mover transition. Moreover, as utilized herein, the term "mover transition" signifies the period of time when one or more movers or robots are temporarily unavailable for use due to failure (in a multiple mover system), scheduled service, repair or maintenance, or other applicable reasons that are generally known in the industry.

In a single mover system, the mover or robot may periodically require service, repair or replacement, i.e. the mover or robot may periodically move to a status of unavailable. Traditionally, automated media libraries use two main approaches to service, repair or replace a failed mover system in an automated media library. The first approach requires the customer to plan for downtime or an outage and the system would usually be taken out of service for a period of time to allow for the repair action. Such an approach requires a "service window" or "outage" where the host application will need to take the library offline and not schedule any operations, as any such operations would fail during the service window. The second approach requires the failed mover to be moved into a separate service area where it will be secured and shielded from other robotic actions for safety reasons to allow for repair or replacement of the failed mover. This approach requires additional hardware and safety mechanisms to service the failed mover. Thus, a better approach may consist of allowing access to the library without the need for additional safety mechanisms to secure and shield the repair operation, and also not requiring the user to schedule any operational outage.

In a system with redundant movers or robots that operate in an active/passive mode, one mover is active and is designed to perform all motion requests, and the secondary passive mover is on standby to take over in the event the active mover fails. In a system with redundant movers that operate in an active/active mode, both movers perform motion requests. In this type of system, in the event of a mover failure, the library either operates in a degraded mode, failing and affecting only those host requests that required the failed mover, or the library allows the operational mover to take over (sometimes referred to as a "failover") and perform all motion requests. While the operational mover can continue to operate and service motion requests, host command response handling for a command that failed and initiated a failover request can be disruptive to a host application and cause the host application to fail. User intervention to restart the application and continue operation is one means to continue operation, however, a transparent approach that will not affect host operations and continue operation is desired.

SUMMARY

The present invention is directed toward a media mover assembly for an open systems based media library, the media mover assembly being used with a host that relays command requests from a user for moving a storage medium within the media library. For example, such command requests can include moving the storage medium relative to a media drive (i.e. to or from the media drive), moving the storage medium from one storage slot to another storage slot, moving the storage medium during import/export operations, and/or other appropriate or necessary moving operations. In certain embodiments, the media mover assembly comprises a first media mover and a control system. The first media mover selectively moves the storage medium within the media library. The first media mover can move between a status of available, when operations and command requests can be performed by the first media mover, and a status of unavailable, when operations and command requests cannot be performed due to mover transition. Additionally, when the first media mover has the status of unavailable due to mover transition, the control system indicates to the host that the first media mover is not ready to perform a motion operation, and is in the process of becoming ready.

Further, in some embodiments, when the first media mover has the status of unavailable, the host will continue to relay command requests to the media library. Additionally, when the first media mover subsequently has the status of available, the control system can perform any subsequent command requests relayed by the host.

Moreover, in one embodiment, when the first media mover has the status of unavailable, the control system indicates for a maximum of a predetermined period of time to the host that the first media mover is not ready to perform a motion operation, and is in the process of becoming ready.

In one embodiment, the media mover assembly can further comprise a second media mover that selectively moves the storage medium within the media library. The second media mover can also move between a status of available and a status of unavailable. In such embodiment, when the first media mover has the status of unavailable due to mover transition, but before the second media mover has the status of available, the control system can indicate to the host that the media movers are not ready to perform a motion operation, and at least one of the media movers is in the process of becoming ready.

Additionally, in one embodiment, the control system utilizes standardized Small Computer System Interface (SCSI) responses when responding to command requests from the host. In such embodiment, when the first media mover has the status of unavailable, the control system responds to the host utilizing a SCSI T10 standardized SCSI response code of Sense Key 2 and ASC/ASCQ 0401. It should be noted that the SCSI T10 standardized SCSI response code of Sense Key 2 and ASC/ASCQ 0401 provides an indication to the host and/or users that the media mover is not ready to perform a motion operation, and is in the process of becoming ready.

The present invention is further directed toward an open systems based media library comprising a storage medium; a media drive for at least one of reading and writing data with respect to the storage medium; and the media mover assembly, as described above, that selectively moves the storage medium within the media library.

Additionally, the present invention is also directed toward a method for mover transition in an open systems based media library for use with a host that relays command requests from a user. In certain embodiments, the method comprises the steps of retaining a storage medium; selectively moving the storage medium within the media library with a first media mover, the first media mover being movable between a status of available and a status of unavailable; and wherein when the first media mover has the status of unavailable due to mover transition, indicating to the host with a control system that the first media mover is not ready to perform a motion operation, and is in the process of becoming ready.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Figure 1:
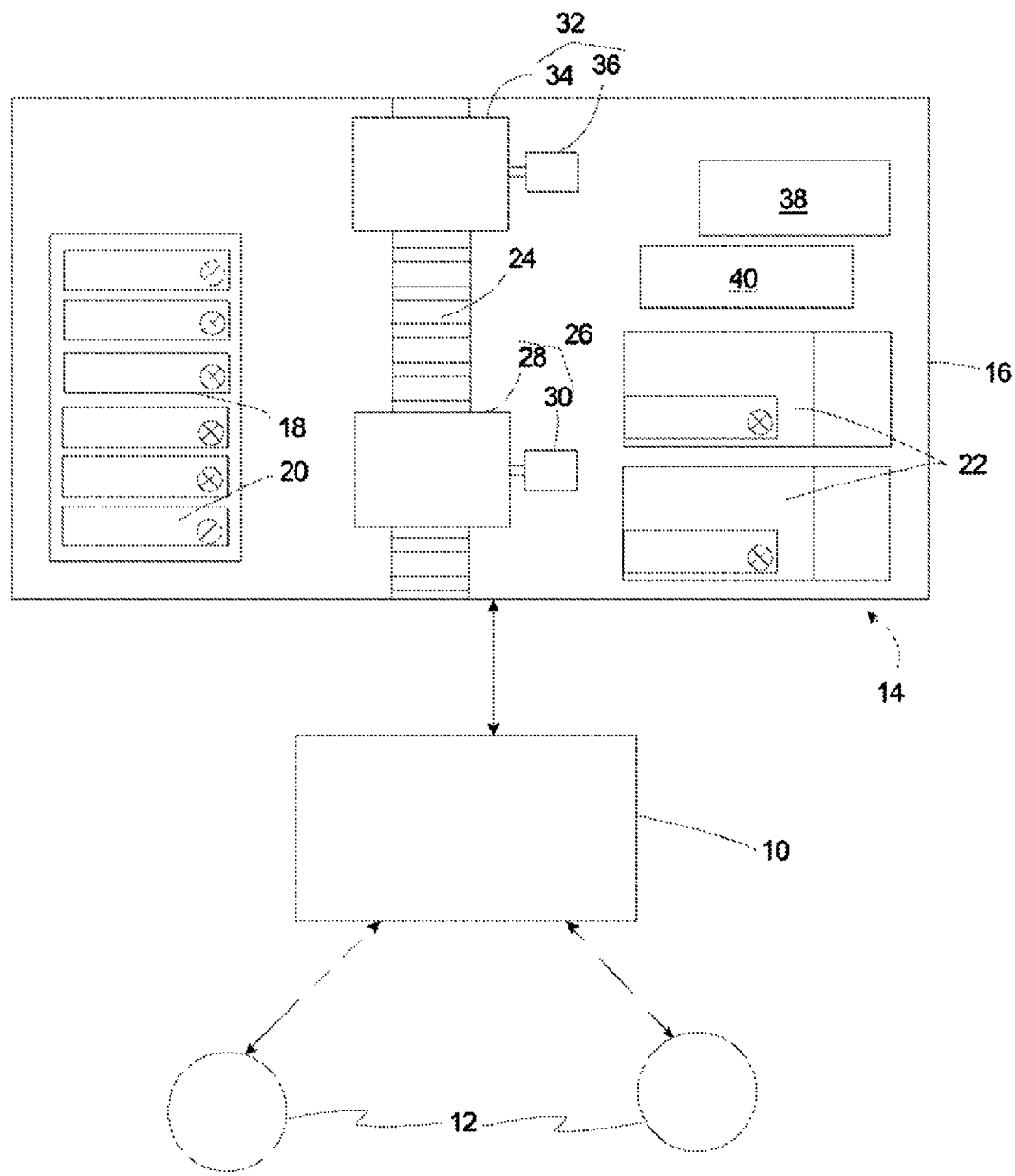
FIG. 1 is a simplified block diagram of a host, one or more users, and an embodiment of a media library including a control system having features of the present invention.

FIG. 1 is a simplified block diagram of a host 10, one or more users 12, and an embodiment of a media library 14, e.g., an automated tape library, having features of the present invention. It should be noted that the media library 14 illustrated in FIG. 1 is just one non-exclusive example of a media library usable with the present invention, and no limitations are intended based on the specific type and/or size of the media library 14 shown in FIG. 1. Additionally, although the media library 14 shown and described relative to FIG. 1 is specifically referred to and described at times as a tape cartridge library or tape library, it is understood that the present invention is equally applicable for use with any other suitable types of libraries using other types of storage media, such as optical disks, magnetic disk drives, emulated or virtual tape drives, etc., as non-exclusive examples. However, for ease of discussion, FIG. 1 and certain other Figures herein are sometimes described using tape cartridges as the applicable storage media, although this is not intended to restrict or limit the present invention in this manner.

As illustrated, the host 10 provides a means of access to the media library 14 for the one or more users 12. Moreover, during operation, the one or more users 12 can issue requests or instructions to the media library 14 that are forwarded via the host 10. Although a single host 10 is illustrated in FIG. 1, it is recognized that any number of hosts can be wired and/or wirelessly connected for use with the media library 14 to provide a means of access to the media library 14 for the one or more users 12. Additionally, as shown in the embodiment illustrated in FIG. 1, the media library 14 can be accessible to two users 12. Alternatively, access to the media library 14 can be limited to only one user 12 or access to the media library 14 can be provided to more than two users 12.

The design of the media library 14 can be varied. In certain embodiments, the media library 14 can be an open systems based media library 14. As utilized herein, the term "open systems based media library" signifies a media library 14 that utilizes a set of standard commands, as opposed to a proprietary media storage library that utilizes a set of proprietary, or unique, commands. For example, in one embodiment, the open systems based media library 14 is a Small Computer System Interface ("SCSI") based media library. Moreover, in one non-exclusive alternative embodiment, the media library 14 can be an easily scalable media library such as the Quantum Scalar i6000 library that automates the retrieval, storage, and control of tape cartridges, and that stores up to 16PB or more of data, enough for very large tape environments and tape consolidation projects.

Additionally, as shown in the embodiment illustrated in FIG. 1, the media library 14 can include (i) a library housing 16 (also sometimes referred to herein simply as a "housing"); (ii) a plurality of storage slots 18 that are adapted to receive and retain a plurality of storage media cartridges 20, e.g., tape cartridges, (sometimes referred to herein simply as "storage media" or "media"); (iii) at least one media drive 22 for reading and/or writing data with respect to the plurality of media 20; (iv) a track 24; (v) a first storage media mover 26 (also sometimes referred to herein simply as a "first media mover") having a first storage media mover body 28 (also sometimes referred to herein simply as a "first mover body") that moves along the track 24, and a first mover motor 30; (vi) a second storage media mover 32 (also sometimes referred to herein simply as a "second media mover") having a second storage media mover body 34 (also sometimes referred to herein simply as a "second mover body") that moves along the track 24, and a second mover motor 36; (vii) a power supply 38; and (viii) a control system 40. Alternatively, the media library 14 can have a different design than that illustrated in FIG. 1. For example, in one non-exclusive alternative embodiment, the media library 14 contains only the first media mover 26 and omits the second media mover 32. Still alternatively, the media library 14 can include more than one track 24 and/or each media mover 26, 32 can include more than one mover motor.

It should be noted that the first media mover 26, i.e. the first mover body 28 and the first mover motor 30; the second media mover 32, i.e. the second mover body 34 and the second mover motor 36; and the control system 40 can be referred to collectively as the "media mover assembly". Additionally and/or alternatively, the first media mover 26 and the control system 40 can be referred to collectively as the "first media mover assembly", and/or the second media mover 32 and the control system 40 can be referred to collectively as the "second media mover assembly".

As an overview, the media library 14 of the present invention is designed to enable mover transition that is largely, if not completely transparent to the host 10 and the one or more users 12. More particularly, during a mover transition operation, i.e. when a media mover has a status of unavailable to accommodate the servicing, repair or replacement of the media mover (e.g., the first media mover 26 and/or the second media mover 32), due to failure, scheduled maintenance, or other applicable reasons, the control system 40 utilizes a standardized response, which indicates to the host 10 that the media library 14 is currently not ready to perform a motion operation, but that the media library 14 is in the process of becoming ready and will be able to perform the operation once the media library 14 transitions to an operational and ready status again. For example, as provided in detail herein, the control system 40 can utilize a SCSI T10 standardized SCSI response code of Sense Key 2 and ASC/ASCQ 0401, Not Ready, Becoming Ready, which provides such an indication to the host 10. Moreover, the control system 40 can be designed to provide such a response for a maximum of a predetermined amount of time to allow for any appropriate and/or necessary servicing, repair or replacement of the media mover 26, 32. For example, in one embodiment, the predetermined amount of time can be ten minutes. Alternatively, the control system 40 can be designed to provide such a response for greater than or fewer than ten minutes. Further, if the mover transition operation is not completed within the predetermined amount of time, then the control system 40 can be designed to subsequently provide a Not Ready, and Not Becoming Ready indication to the host 10 until the media library 14 transitions to an operational and ready status again.

Additionally, during the period that the Not Ready, Becoming Ready, response is being provided to the host 10 and/or users 12, the host 10 will not immediately stop any operations and alert the users 12, but instead will continue to test the media library 14 to become ready, and then continue operations, making the overall service operation transparent to the users 12. Subsequently, once the media mover 26, 32 again has a status of available, and when the media library 14 is once again fully operational, the host 10 and/or the users 12 will again be able to have any and all command requests responded to by the media library 14 appropriately and effectively.

As illustrated in FIG. 1, the housing 16 may be substantially rectangular or square in cross section. Alternatively, the housing 16 can have another suitable shape or configuration. For example, the housing 16 can have a substantially circular cross-sectional shape. Additionally, the housing 16 may be constructed of any number of conventional materials such as, for example, those utilized in industry standard rack mount cabinets.

Additionally, as noted above, the media library 14 can include the plurality of storage slots 18 and the plurality of media 20. As shown in FIG. 1, the plurality of storage slots 18 and the plurality of media 20 can be positioned within the housing 16, with the media 20 being received and retained within the storage slots 18. In alternative embodiments, the media library 14 can include any suitable number of storage slots 18, and/or the media library 14 can have any suitable number of media 20. Further, the media 20 can include a plurality of tape cartridges, or the media 20 can alternatively include a plurality of optical disks, magnetic disk drives, emulated tape drives, etc., as non-exclusive examples.

As provided above, the media library 14 further includes the at least one media drive 22 for reading and/or writing data with respect to the plurality of media 20. For example, as illustrated in FIG. 1, the media library 14 can include two media drives 22 for reading and/or writing data with respect to the plurality of media 20. Alternatively, the media library 14 can include only one media drive 22 or the media library 14 can include greater than two media drives 22. Further, depending on the specific design of the media library 14, the media drive 22 can be adapted for use with different types of media, such as tape cartridges, optical drives, hard disk drives, etc.

The configuration of the track 24 can vary to suit the design requirements of the media library 14. In one embodiment, the track 24 can extend substantially from one side of the media library 14 to the other. Alternatively, the track 24 can extend only partially between two opposing sides of the media library 14 and/or the track 24 can extend along multiple axes within the media library 14. Further, the track 24 can be positioned substantially between the plurality of storage slots 18, which receive and retain the plurality of media 20, and the at least one media drive 22. Moreover, the track 24 can be varied as necessary to accommodate any suitable type of media mover assembly.

The first media mover 26 and the second media mover 32 can be substantially similar in design and operation. As provided herein, each of the first media mover 26 and the second media mover 32 can move between a status of available and a status of unavailable. Additionally, the first media mover 26 and the second media mover 32 can be designed to operate in an active/passive mode and/or the first media mover 26 and the second media mover 32 can be designed to operate in an active/active mode. In the active/passive mode, one of the media movers 26, 32 is active and, as such, is designed to perform all motion requests from the host 10 and/or users 12, and the other media mover 32, 26 is on standby to take over in the event that the active media mover 26, 32 fails or otherwise becomes unavailable. In the active/active mode, both of the media movers 26, 32 are designed to perform motion requests from the host 10 and/or users 12. In such embodiments, in the event that one of the media movers 26, 32 fails or otherwise becomes unavailable, the media library 14 can either operate in a degraded mode, or the media mover 26, 32 that is still available can be allowed to take over and perform all motion requests. In any of the above-noted situations, during the failover period, when one media mover is compensating for the unavailability of the other media mover, certain commands or requests from the host 10 and/or users 12 may not be appropriately completed. Moreover, during this failover period, in accordance with the teachings provided herein, the control system 40 indicates to the host 10 that the media library 14 is currently not ready to perform a motion operation, but that the media library 14 is in the process of becoming ready.

Alternatively, as noted above, in certain embodiments, the media library 14 can be designed with only the first media mover 26 and can omit the second media mover 32. In such embodiments, when the first media mover 26 becomes unavailable due to mover transition, e.g., scheduled maintenance, the commands or requests from the host 10 and/or users 12 that occur during that period cannot be appropriately completed. It is during this mover transition that, in accordance with the teachings provided herein, the control system 40 indicates to the host 10 that the media library 14 is currently not ready to perform a motion operation, but that the media library 14 is in the process of becoming ready.

As provided above, the first media mover 26 includes the first mover body 28 and the first mover motor 30, and the second media mover 32 includes the second mover body 34 and the second mover motor 36. The design of the media movers 26, 32, the mover bodies 28, 34, and the mover motors 30, 36 can be varied depending upon the requirements of the media library 14. Moreover, it is recognized that many different types of media movers 26, 32 can be utilized within the media library 14, and the illustration and/or description of any one such type is not intended to limit the scope of the present invention in any manner. For example, in certain embodiments, the media movers 26, 32 can include a rack and pinion system, a pulley or belt system, or some other suitable type of media mover.

In the embodiment illustrated in FIG. 1, the first mover body 28 is positioned within the housing 16 along the track 24 substantially between the plurality of storage slots 18, which receive and retain the plurality of media 20, and the at least one media drive 22. In this manner, when the first media mover 26 has the status of available, the first media mover 26 is able to load and unload media 20 to and from all of the storage slots and the media drive 22 within the media library 14. Somewhat similarly, the second mover body 34 can be positioned within the housing 16 along the track 24 substantially between the plurality of storage slots 18 and the at least one media drive 22. In this manner, when the second media mover 32 has the status of available, the second media mover 32 is able to load and unload media 20 to and from all of the storage slots and the media drive 22 within the media library 14. Moreover, in the active/passive mode, the passive media mover, e.g., the second media mover 32, can be positioned away from the storage slots 18, the media 20, and the media drive 22, e.g., in a special parking module, so as to not restrict access to the storage slots 18, the media 20, and the media drive 22 for the active media mover, e.g., the first media mover 26.

The design of the mover motors 30, 36 can be varied. For example, the mover motors 30, 36 may comprise any controllably positionable electric or non-electric motor such as a stepper motor, a servo motor, a linear motion device, or a DC motor. Alternatively, the mover motors 30, 36 may have a different design known to those skilled in the art.

During use, upon receiving a signal from the control system 40 to access a certain media 20, the first mover motor 30 can drive the first mover body 28 so that it moves translationally along the track 24 to the appropriate position to access the requested media 20. Somewhat similarly, during use, upon receiving a signal from the control system 40 to access a certain media 20, the second mover motor 36 can drive the second mover body 34 so that it moves translationally along the track 24 to the appropriate position to access the requested media 20.

Each of the media movers 26, 32 may further include a robotic mechanism (not illustrated), which upon direction from the control system 40 physically retrieves an appropriate media 20 from its associated storage slot 18 in the media library 14. Subsequently, the robotic mechanism moves the media 20 to an appropriate media drive 22, and inserts the media 20 into the media drive 22 so that the requested read/write operations can be performed. Upon completion of the requested read/write operations, the robotic mechanism can then return the media 20 to an appropriate storage slot 18. Additionally and/or alternatively, the robotic mechanism can move the media 20 from one storage slot 18 to another storage slot 18, and/or the robotic mechanism can move the media as necessary during an import/export operation.

The power supply 38 provides electrical power in a well known manner to the plurality of storage slots 18, the at least one media drive 22, the first media mover 26, the second media mover 32, and the control system 40. The power supply 38 can be interfaced with these components as well as with an external power source in a well known manner using industry standard cabling and connections. Alternatively, the power supply 38 can be interfaced with these components in another manner.

In one embodiment, the control system 40 can control the various operations of the media library 14 such that the media library 14 may be operated for use in conventional data processing. The control system 40 can have any suitable design, many of which are well known in the industry. For example, the control system 40 can be a single controller system or the control system 40 can be a multiple controller system in which the various functions of the media library are distributed amongst the controllers. Moreover, in some embodiments in which the control system 40 includes multiple controllers, one or more controllers may be substantially directly connected to each of the media movers 26, 32, i.e. to the mover bodies 28, 34 and/or the mover motors 30, 36.

The media library 14 can use well-known industry standard cabling and communication protocols between the control system 40 and the other components of the media library 14. Cabling and electrical characteristics including signaling protocols can be generally standardized, and the logical message protocols can be either proprietary or standardized as known to those skilled in the art. Alternatively, the media library 14 can be designed without the need for cabling.

As noted above, in certain embodiments, the media library 14 can be an open systems based media library 14, and the control system 40 can utilize a set of standardized responses to user 12 and/or host 10 requests. For example, in one such embodiment, the control system 40 can utilize a set of SCSI T10 standardized responses to the hosts 10 and/or to the users 12. The SCSI T10 standardized responses can include a Sense Key in combination with an Additional Sense Code (ASC) and an Additional Sense Code Qualifier (ASCQ).

The following Table 1 provides descriptions of certain Sense Key values:

TABLE 1

Sense Key Value Descriptions

| Sense Key | Description |
| --- | --- |
| 0h | No Sense. No specific sense key information to report. |
| 2h | Not Ready. The library is not ready to perform motion commands. |
| 4h | Hardware Error. A hardware error was detected and operator intervention may be required. |
| 5h | Illegal Request. The CDB or supplied parameter data contains an unsupported or illegal parameter. |
| 6h | Unit Attention. The library operating status changed. Additional processing may be required. |
| Bh | Aborted Command. The library aborted the command. |

Additionally, the following Table 2 lists some of the Additional Sense Codes (ASC) and Additional Sense Code Qualifiers (ASCQ) that are associated and usable with the reported Sense Keys. It should be noted that a Sense Key of 0h (no sense) has no ASC/ASCQ associated with it. The Sense Keys that can give a particular ASC/ASCQ are indicated with an "x" in the appropriate column.

TABLE 2

ASC/ASCQ Value Descriptions for Specified Sense Keys

| | | Sense Keys | | | | | |
|---|---|---|---|---|---|---|---|
| ASC | ASCQ | 2 | 3 | 4 | 5 | B | Description |
| 04h | 00h | x | | | | | The library is not ready due to an unknown cause |
| 04h | 00h | | | | | x | LU Communication - SCSI Command Communication Failure |
| 04h | 01h | x | | | | | The library is becoming ready |
| 04h | 03h | x | | | | | The library is not ready and a manual intervention is required |
| 04h | 12h | x | | | | | Logical unit not ready, offline |
| 04h | 83h | x | | | | | The library is not ready due to aisle power being disabled |
| 04h | 8Dh | x | | | | | The library is not ready because it is offline |

As shown in Table 1 and Table 2, in one embodiment, the appropriate response for the control system 40 to indicate that the media library 14 is Not Ready, Becoming Ready, as described in detail herein, is the SCSI T10 standardized SCSI response code of Sense Key 2 and ASC/ASCQ 0401. It should be noted that the SCSI T10 standardized SCSI response code of Sense Key 2 and ASC/ASCQ 0401, Not Ready, Becoming Ready, is typically only reported after a library power up and initialization, and does not get reported once a library is fully initialized as the library is either ready or not ready to perform operations. However, as detailed herein, when one or both of the first media mover 26 and the second media mover 32 has the status of unavailable, it is advantageous to use the defined/standardized SCSI response to identify that the library is becoming ready so that hosts do not immediately stop any operations and alert the user, but continue to test the library to become ready, and then continue operations, making the overall service or failover operation transparent to a user.

It should further be noted that in the following flow charts, although it is disclosed that the steps employed in the use of the media library are performed in a certain order, it should be noted that the steps can be performed in a different order, and/or one or more of the steps can be combined or eliminated without altering the overall intended scope and breadth of the present invention.

Figure 2:
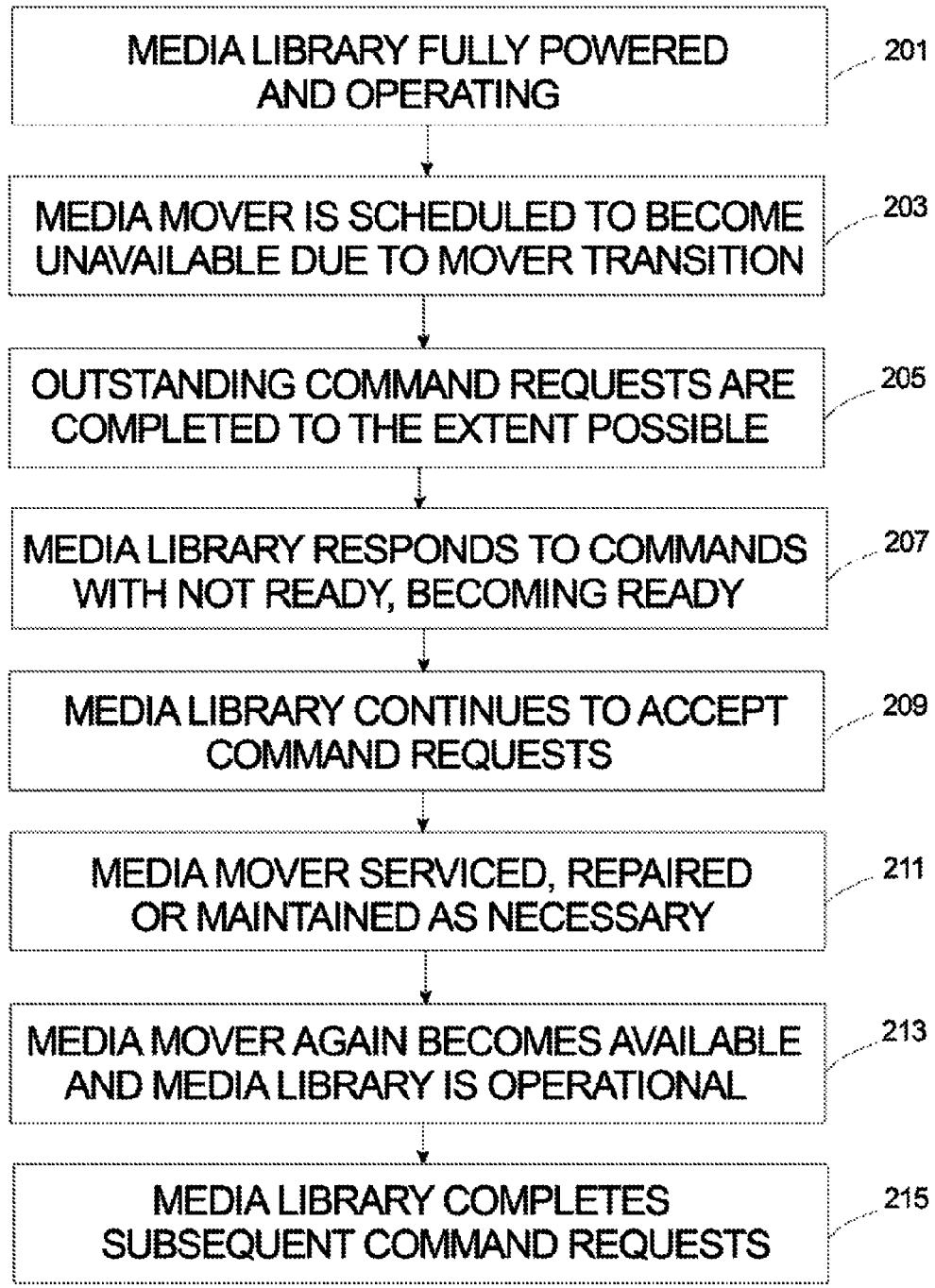
FIG. 2 is a simplified flow chart that illustrates a method for mover transition in a media library including one storage media mover assembly.

FIG. 2 is a simplified flow chart that illustrates a method for mover transition in a media library including one single storage media mover assembly (or "media mover assembly") and one single storage media mover (or "media mover"). Initially, in step 201, the media library is fully powered up and is operating in a normal manner. Subsequently, in step 203, the media mover is still operational, but the media mover is scheduled to become unavailable, i.e. the media mover is scheduled to move from a status of available to a status of unavailable. In such embodiments, during operation, the media mover will periodically become unavailable during a mover transition operation such as due to scheduled service, repair or maintenance, or other applicable reasons. During the mover transition operation, power to the media mover will be disabled to allow secure and safe access to the media mover to perform any required service, repair or maintenance procedure.

In step 205, to the extent possible, the media library, under control of the control system, will complete any currently outstanding command requests from the hosts and/or users. Then, in step 207, when the media mover is unavailable due to mover transition operation, the media library, i.e. the control system, will respond to any subsequent requests from the hosts and/or users with an indication that the media library is currently not ready to perform a motion operation, but that the library is in the process of becoming ready and be able to perform the operation once the library transitions to an operational and ready status again. For example, in one embodiment, the media library will respond to subsequent requests from the hosts and/or users with a SCSI T10 standardized SCSI response code of sense Key 2 and ASC/ASCQ 0401, Not Ready, Becoming Ready. Alternatively, the media library may respond with another standardized response from another standardized system, or the media library may provide a response from a proprietary system that also indicates that the media library is currently not ready to perform a motion operation, but that the library is in the process of becoming ready and be able to perform the operation once the library transitions to an operational and ready status again. Moreover, as provided above, the media library can be designed to provide such a response to the hosts and/or users for a maximum of a predetermined period of time, e.g., ten minutes or another appropriate time period.

During the period in which the media library is responding with the Not Ready, Becoming Ready, indication to the hosts and/or users, in step 209, the hosts will not immediately stop any operations and alert the users, but instead may continue to test the media library to become ready, and then continue operations, making the overall service operation transparent to the users. Additionally, during this period, in step 211, the media mover will be serviced, repaired or maintained as necessary.

Subsequently, in step 213, the media mover will again become available, and the media library will again become fully operational. Finally, in step 215, the hosts and/or the users 12 will continue to issue command requests to the media library, which can again be responded to by the media library 14 appropriately and effectively. Moreover, the media library will continue to function in a normal manner until the next time that the media mover becomes unavailable due to mover transition. With the present invention, host initiated archival or backup and/or restore operations can continue seamlessly, with no application outage needing to be scheduled.

It should be noted that if time beyond the predetermined period of time is required for the servicing, repairing or replacing of the media mover, then the control system can be designed to subsequently provide a Not Ready, and Not Becoming Ready indication to the hosts and/or users until the media library transitions to an operational and ready status again.

Figure 3:
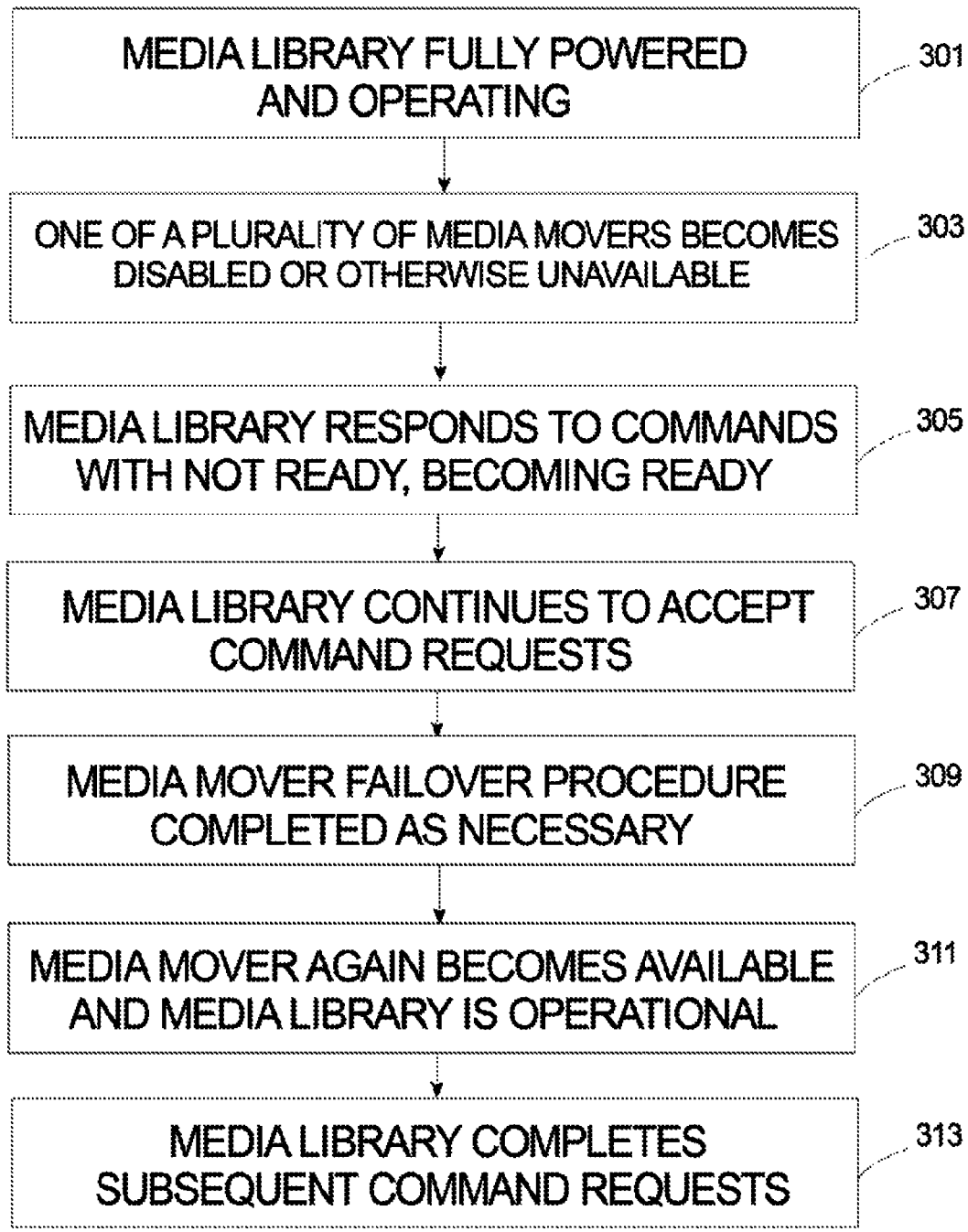
FIG. 3 is a simplified flow chart that illustrates a method for mover transition in a media library including greater than one storage media mover assembly.

FIG. 3 is a simplified flow chart that illustrates a method for mover transition in a media library including a plurality of storage media mover assemblies (or "media mover assemblies") and a plurality of storage media movers (or "media movers"). In such embodiments, regardless of whether the media movers are operating in an active/passive or an active/active mode, a motion request that cannot be completed by a media mover due to a mover transition, i.e. failure, scheduled maintenance, etc., would typically be responded to with a failure condition to inform the host of the failure to complete the command request. Additionally, in one embodiment, advanced SCSI host applications would not necessarily stop operation and alert the user, but may alternatively issue additional commands to determine library status and possibly recover and reissue commands, especially if the library continues to report that it is operational due to having redundant robotics control. Many SCSI applications, however, do not recover automatically and request user intervention after a motion command request fails.

As detailed herein, to prevent a SCSI host from ceasing operation and possibly interrupting a backup or restore operation, the media library command response can be manipulated to not just report a command failure, but actually report a status that keeps the host's "interest" and have the host repeat command requests rather than report a failure condition.

With conventional systems, if a motion command fails, the command failure is reported to the host. Hosts then either retry the command or fail operations. In configurations with redundant robotics, i.e. greater than one media mover, the media library could possibly just have the operational media mover complete the command, but often such failover operation takes time and possibly cause the host to time out its command request. The media library described herein provides an improved approach for addressing this issue.

Initially, in step 301, the media library is fully powered up and is operating in a normal manner. Subsequently, in step 303, one of the plurality of media movers is disabled or otherwise becomes unavailable, i.e. one of the plurality of media movers moves from a status of available to a status of unavailable. In such embodiments, during operation, a media mover will periodically become unavailable due to mover transition, i.e. due to failure or scheduled service, repair or maintenance (which may require a failover operation), or other applicable reasons. During the mover transition operation, power to the media mover will be disabled to allow secure and safe access to the media mover to perform any required service, repair or replacement procedure.

In step 305, as an alternative and better approach to failing the SCSI command or having the redundant media mover complete the command after all retry and recovery operations by the failed media mover are exhausted, the media library can just not report the failure and not "hold" the command any longer for the redundant operational media mover to complete the command. Instead, when the media movers are unavailable due to mover transition operation, the media library, i.e. the control system, can respond to the hosts and/or users with an indication that the media library is currently not ready to perform a motion operation, but that the library is in the process of becoming ready and be able to perform the operation once the library transitions to an operational and ready status again. For example, in one embodiment, the media library will respond to such requests from the hosts and/or users with a SCSI T10 standardized SCSI response code of sense Key 2 and ASC/ASCQ 0401, Not Ready, Becoming Ready. Alternatively, the media library may respond with another standardized response from another standardized system, or the media library may provide a response from a proprietary system that also indicates that the media library is currently not ready to perform a motion operation, but that the library is in the process of becoming ready and be able to perform the operation once the library transitions to an operational and ready status again. Moreover, as provided above, the media library can be designed to provide such a response to the hosts and/or users for a maximum of a predetermined period of time, e.g., ten minutes or another appropriate time period.

The result of such response, e.g., the SCSI T10 standardized SCSI response code of sense Key 2 and ASC/ASCQ 0401, Not Ready, Becoming Ready, is that the host application is not made aware of an issue with the previously received motion request. Moreover, the host application is also not blocked and required to wait for a response longer than the host may be configured to wait before timing out the command. Responding as soon as a failover is initiated and informing the host that the media library is becoming ready, causes the host to test library status and resend the motion request once the library responds with ready status again. The fact that the library actually failed the previous motion request and successfully failed over to the redundant media mover is completely transparent to the host.

During the period in which the media library is responding with the Not Ready, Becoming Ready, indication to the hosts and/or users, in step 307, the hosts will not immediately stop any operations and alert the users, but instead may continue to test the media library to become ready, and then continue operations, making the overall service operation transparent to the users. Additionally, during this period, in step 309, the failover procedure will be completed as necessary.

Subsequently, in step 311, with the failover procedure completed, the media movers will again become available and the media library will again become fully operational. Finally, in step 313, the hosts and/or the users 12 will continue to issue command requests to the media library, which can again be responded to by the media library 14 appropriately and effectively. Moreover, the media library will continue to function in a normal manner until the next time that a media mover becomes unavailable due to mover transition, i.e. a failover procedure is required and/or scheduled service, repair or maintenance is conducted. With the present invention, host initiated archival or backup and/or restore operations can continue seamlessly, with no application outage needing to be scheduled.

It should be noted that if time beyond the predetermined period of time is required for the failover procedure, then the control system can be designed to subsequently provide a Not Ready, and Not Becoming Ready indication to the hosts and/or users until the media library transitions to an operational and ready status again.

While a number of exemplary aspects and embodiments of a media library 14 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A media mover assembly for an open systems based media library, the media mover assembly being used with a host that relays command requests for moving a storage medium within the media library, the media mover assembly comprising:
   a first media mover that selectively moves the storage medium within the media library, the first media mover being movable between a status of available and a status of unavailable; and
   a control system, wherein when the first media mover has the status of unavailable due to mover transition, the control system indicates for a predetermined period of time to the host that the first media mover is not ready to perform a motion operation, and is in the process of becoming ready.

2. The media mover assembly of claim 1 wherein when the first media mover has the status of unavailable, the control system continues to accept and queue command requests from the host.

3. The media mover assembly of claim 2 wherein when the first media mover subsequently has the status of available, the control system performs the queued command requests in the order in which they were received.

4. The media mover assembly of claim 1 further comprising a second media mover that selectively moves the storage medium within the media library, the second media mover being movable between a status of available and a status of unavailable.

5. The media mover assembly of claim 4 wherein when the first media mover has the status of unavailable, but before the second media mover has the status of available, the control system indicates to the host that the media movers are not ready to perform a motion operation, and at least one of the media movers is in the process of becoming ready.

6. The media mover assembly of claim 1 wherein the control system utilizes standardized Small Computer System Interface (SCSI) responses when responding to command requests from the host.

7. The media mover assembly of claim 6 wherein when the first media mover has the status of unavailable, the control system responds to the host utilizing a SCSI T10 standardized SCSI response code of Sense Key 2 and ASC/ASCQ 0401.

8. An open systems based media library comprising a storage medium; a media drive for at least one of reading and writing data with respect to the storage medium; and the media mover assembly of claim 1 that selectively moves the storage medium relative to the media drive.

9. A method for mover transition in an open systems based media library for use with a host that relays command requests, the method comprising the steps of:
retaining a storage medium;
selectively moving the storage medium relative to a media drive with a first media mover, the first media mover being movable between a status of available and a status of unavailable;
wherein when the first media mover has the status of unavailable, indicating to the host with a control system for a predetermined period of time that the first media mover is not ready to perform a motion operation, and is in the process of becoming ready.

10. The method of claim 9 further comprising the step of continuing to accept and queue command requests from the host with the control system when the first media mover has the status of unavailable.

11. The method of claim 10 further comprising the step of performing the queued command requests with the control system when the first media mover subsequently has the status of available.

12. The method of claim 9 wherein the step of indicating includes when the first media mover has the status of unavailable, indicating to the host with the control system for a predetermined period of time that the first media mover is not ready to perform a motion operation, and is in the process of becoming ready.

13. The method of claim 9 further comprising the step of selectively moving the storage medium relative to the media drive with a second media mover, the second media mover being movable between a status of available and a status of unavailable.

14. The method of claim 13 further comprising the step of when the first media mover has the status of unavailable, but before the second media mover has the status of available, indicating to the host with the control system that the media movers are not ready to perform a motion operation, and at least one of the media movers in the process of becoming ready.

15. The method of claim 9 wherein the control system utilizes standardized Small Computer System Interface (SCSI) responses when responding to command requests from the host.

16. The method of claim 15 wherein the step of indicating includes when the first storage media mover has the status of unavailable, responding to the host with the control system utilizing a SCSI T10 standardized SCSI response code of Sense Key 2 and ASC/ASCQ 0401.

17. A method for mover transition in an open systems based media library for use with a host that relays command requests from a user, the method comprising the steps of:
retaining a storage medium;
selectively moving the storage medium relative to a media drive with a first media mover, the first media mover being movable between a status of available and a status of unavailable;
wherein when the first media mover has the status of unavailable, (i) indicating to the host with a control system for a predetermined period of time that the first media mover is not ready to perform a motion operation, and is in the process of becoming ready, and (ii) continuing to accept and queue command requests from the host with the control system; and
wherein when the first media mover subsequently has the status of available, performing the queued command requests with the control system in the order in which they were received.

18. The method of claim 17 wherein the step of indicating includes when the first storage media mover has the status of unavailable, responding to the host with the control system utilizing a SCSI T10 standardized SCSI response code of Sense Key 2 and ASC/ASCQ 0401.

* * * * *